(12) United States Patent
Suttie

(10) Patent No.: US 6,806,589 B1
(45) Date of Patent: Oct. 19, 2004

(54) NO BREAK ELECTRIC POWER TRANSFER SYSTEM

(75) Inventor: Peter J. Suttie, San Diego, CA (US)

(73) Assignee: Hamilton Sundstrand Corporation, Rockford, IL (US)

(*) Notice: Subject to any disclaimer, the term of this patent is extended or adjusted under 35 U.S.C. 154(b) by 0 days.

(21) Appl. No.: 10/623,785

(22) Filed: Jul. 21, 2003

(51) Int. Cl.$^7$ ................................................ H02J 3/02
(52) U.S. Cl. ............................................................ 307/73
(58) Field of Search ............................ 307/64–68, 73

(56) References Cited

U.S. PATENT DOCUMENTS

| | | |
|---|---|---|
| 3,418,550 A | 12/1968 | Kolatorowicz et al. |
| 3,526,778 A | 9/1970 | Crocker et al. |
| 3,614,461 A | 10/1971 | Speer et al. |
| 3,631,256 A | 12/1971 | Reynolds |
| 3,665,495 A | 5/1972 | Carter et al. |
| 3,678,285 A | 7/1972 | Griffith |
| 3,764,814 A | 10/1973 | Griffith |
| 3,810,251 A | 5/1974 | Blanyer |
| 4,779,007 A | 10/1988 | Schlanger et al. |
| 5,276,661 A | 1/1994 | Beg |
| 5,422,778 A | 6/1995 | Good et al. |
| 5,939,800 A | 8/1999 | Artinian et al. |
| 6,114,775 A | 9/2000 | Chung et al. |
| 6,175,166 B1 | 1/2001 | Bapat |
| 6,278,262 B1 | 8/2001 | Ullyott |
| 6,630,752 B2 * | 10/2003 | Fleming et al. ................ 307/64 |

* cited by examiner

Primary Examiner—Gregory J. Toatley, Jr.

(57) ABSTRACT

A no break power transfer system that is particularly useful onboard an aircraft ensures that there is an appropriate frequency match between the outputs of different power supplies. A frequency adjuster between an auxiliary power unit and a load alters the frequency of power available from the auxiliary power unit before that power is supplied to the load. In one example, a controller determines when the frequency of output power from the main power supply does not match that from the auxiliary power unit. The controller controls the frequency adjuster to make an appropriate frequency change until there is a sufficient match. In one example, the frequency adjuster includes a rectifier that converts an alternating current output of the auxiliary power unit to a direct current output that is then converted by an inverter to provide an alternating current output having the appropriate frequency.

18 Claims, 1 Drawing Sheet

NO BREAK ELECTRIC POWER TRANSFER SYSTEM

BACKGROUND OF THE INVENTION

This invention generally relates to a no break power transfer system. More particularly, this invention relates to ensuring that there is an appropriate frequency match when transferring power between different supplies in a no break power transfer system.

There are various known arrangements where a secondary or back-up power supply is used in the event of a main power supply failure. There are other situations where auxiliary or back-up power supplies are strategically used on a temporary basis even though the main power supply may be completely functional.

One example situation where multiple power supplies are utilized is on a modern aircraft. There typically is a main power supply that is sometimes referred to as a main engine generator. An auxiliary power unit (APU) is used in place of the main power supply for various reasons known in the art.

For a successful switch between power supplies without interrupting power to the electrical component, a so-called no break power transfer is required. This typically involves simultaneously coupling both power supplies to the load and then disconnecting a selected one of the power supplies. The output of the power supplies typically matches so there is no problem when they are both coupled with the load and there is no discernable break in power at the load.

Traditionally, the auxiliary power unit and the main power supply were set to meet appropriate needs of the aircraft electrical systems. More recently, however, it has been increasingly proposed to use variable frequency alternating current electrical bus networks in place of traditional constant frequency systems. The variable frequencies that may be used introduce further complexities to achieve a successful no break power transfer. This invention addresses the need for ensuring that an appropriate frequency match occurs during a no break power transfer.

SUMMARY OF THE INVENTION

In general terms, this invention is a no break power transfer system that ensures that there is an appropriate frequency match associated with the outputs of multiple power supplies during a no break power transfer.

One system designed according to this invention includes a main power supply that is selectively coupled to a load. An auxiliary power unit is selectively coupled to the load. A frequency adjuster is between the auxiliary power unit and the load for selectively controlling the frequency of the power available from the load from the auxiliary power unit. The frequency adjuster ensures that there is a frequency match between the alternate supplies to the load during a no break power transfer.

In one example, the frequency adjuster includes a controller that monitors the frequencies on the supply lines to the load associated with the different power supplies. The controller operates an inverter that controls the frequency of the power available from the auxiliary power unit.

In one example, the inverter modifies the frequency of the power received from the auxiliary power unit as needed when the power transfer is made in either direction between the main power supply and the auxiliary power unit.

The various features and advantages of this invention will become apparent to those skilled in the art from the following detailed description of the currently preferred embodiment. The drawing that accompanies the detailed description can be briefly described as follows.

DETAILED DESCRIPTION OF THE PREFERRED EMBODIMENT

Figure 1:
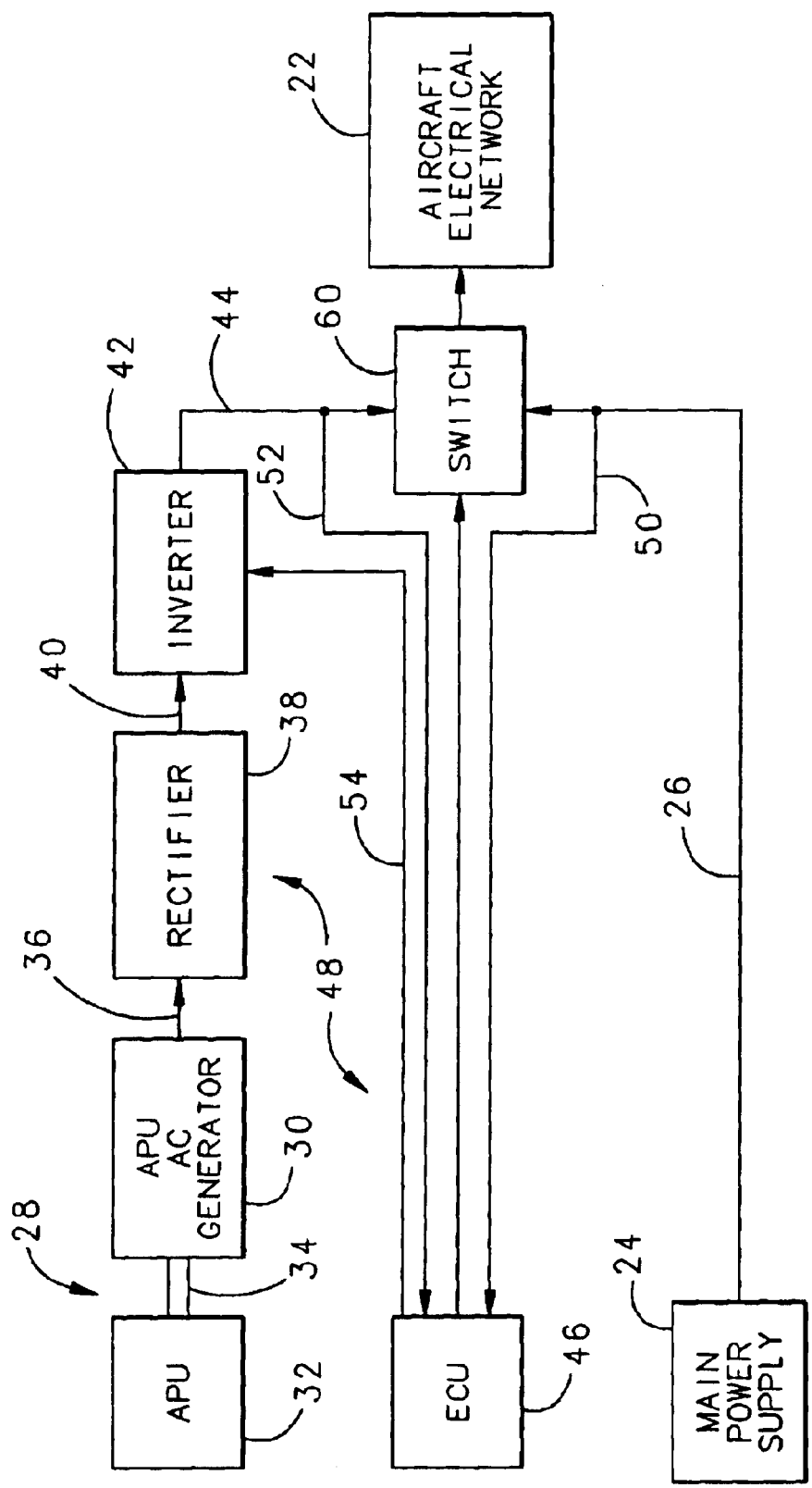
FIG. 1 schematically illustrates a no break power transfer system designed according to this invention.

The figure schematically shows a no break power transfer system 20. An electrical network 22 represents a load onboard an aircraft that includes various electrically powered components. In one example, the electrical network 22 includes a variable frequency electrical bus network. A main power supply 24 provides power along a supply line 26 to the electrical network 22. The main power supply 24 in one example is an engine generator on the aircraft.

The electrical network 22 often requires constant power supply to maintain appropriate operation of the various components that must receive power. An auxiliary power unit (APU) 28 includes a generator 30 and a source of power 32 such as an engine. The source 32 is mechanically coupled at 34 with the generator 30 in a conventional manner. The output from the generator 30 on the line 36 is an alternating current (AC) output, whose frequency depends upon the speed of operation, for example, of the generator 30.

A rectifier 38 converts the AC output of the generator 30 to a direct current (DC) output at 40. An inverter 42 includes electronic components suitable for receiving the DC output of the rectifier 38 and providing an AC output on the line 44 that is supplied to the electrical network 22. Those skilled in the art who have the benefit of this description will be able to select or design an inverter having conventional switching, solid state devices or both to meet the needs of their particular situation. In the illustrated example, a controller 46 controls the operation of the inverter 42 to achieve a desired AC output on the supply line 44. In this example, the rectifier 38, inverter 42 and controller 46 are all part of a frequency adjuster 48.

Because the electrical network 22 may require variable frequency power, it is possible that power supplied from the main power supply 24 is of a different frequency than that which is normally provided by the APU generator 30. The controller 46 determines when the frequencies of the two power supplies do not match and controls the inverter 42 such that there is a frequency match to achieve a no break power transfer between the power supplies so that power to the network 22 is not interrupted.

In the illustrated example, the controller 46 includes inputs 50 and 52 that provide frequency information regarding the output of the main power supply 24 and the inverter 42, respectively. The controller 46 preferably is programmed to determine when there is a need to change the operation of the inverter 42 so that the output on the line 44 matches that on the line 26. An input 54 to the inverter 42 allows the controller 46 to provide suitable commands for altering the operation of the solid state devices, for example, within the inverter 42 to achieve the designed output at 44. Given this description, those skilled in the art will be able to program a commercially available microprocessor to meet their particular needs.

A switch arrangement 60 is responsive to the controller 46 to achieve transferring power between the supplies as needed, provided that the controller 46 confirms that there is a match between the power supply frequencies on the lines 26 and 44. When there is a match, the switching arrangement 60 allows for both power supplies to be simultaneously coupled with the network 22. Then the appropriate supply may be disconnected, completing the no break power transfer.

The controller 46 is operative to command the inverter 42 to provide a selected output at 44 so that the main power supply 24 can be disconnected and replaced with the APU 28. The controller 46 is also operative to modify the frequency provided by the inverter 42 when a power transfer occurs from the APU 28 to the main power supply 24.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A no break power transfer system, comprising:
    a main power supply that selectively supplies electrical power to a load;
    an auxiliary power unit that selectively supplies electrical power to the load; and
    a frequency adjuster between the auxiliary power unit and the load, the frequency adjuster selectively altering the frequency of power available from the auxiliary power unit to ensure that there is a frequency match between the power available from the main power supply and that which is available from the auxiliary power unit.

2. The system of claim 1, including a controller that determines a frequency of the power from the main power supply and controls the frequency adjuster to achieve a desired frequency match.

3. The system of claim 2, wherein the frequency adjuster includes a rectifier that converts an alternating current output of the auxiliary power unit to a direct current output and an inverter that converts the direct current output of the rectifier to an alternating current output having a selected frequency.

4. The system of claim 3, wherein the inverter is responsive to the controller such that the controller commands the desired output from the inverter.

5. The system of claim 1, wherein the frequency adjuster is operative to alter the frequency of power available from the auxiliary power unit during a switch from the main power supply to the auxiliary power unit.

6. The system of claim 1, wherein the frequency adjuster is operative to alter the frequency of power available from the auxiliary power unit during a switch from the auxiliary power unit to the main power supply.

7. The system of claim 1, including a switch arrangement that selectively couples the main power supply and the auxiliary power unit to the load and wherein the switching arrangement couples both power supplies to the load only when there is a suitable frequency match between the output of the frequency adjuster and the main power supply.

8. The system of claim 5, wherein the frequency adjuster alters the frequency of the power available from the auxiliary power unit before the auxiliary power is provided to the load.

9. The system of claim 6, wherein the frequency adjuster alters the frequency of the power from the auxiliary power unit that is supplied to the load before the switch from the auxiliary power unit to the main power supply.

10. The system of claim 1, wherein the frequency adjuster is in series between the auxiliary power unit and the load on the only connection between the auxiliary power unit and the load.

11. The system of claim 1, wherein the load comprises a variable frequency load.

12. A no break power transfer system, comprising:
    a main power supply that selectively supplies electrical power to a load;
    an auxiliary power unit that selectively supplies electrical power to the load; and
    a frequency adjuster between the auxiliary power unit and the load, the frequency adjuster selectively altering the frequency of power available from the auxiliary power unit to ensure that there is a frequency match between the power available from the main power supply and that which is available from the auxiliary power unit, wherein the load comprises a variable frequency alternating current electrical bus network.

13. A method of completing a no break power transfer between a main power supply and an auxiliary power unit to provide electrical power to a load, comprising the steps of:
    determining a frequency of output power available from the main power supply;
    determining a frequency of the output power available from the auxiliary power unit; and
    altering the frequency of the power from the auxiliary power unit between the auxiliary power unit and the load to ensure that there is a frequency match between the power available from the main power supply and the power available from the auxiliary power unit.

14. The method of claim 13, including rectifying an output from the auxiliary power unit to thereby provide a direct current output and inverting the direct current output to thereby provide an alternating current output having a selected frequency.

15. The method of claim 13, including making a switch from the main power supply to the auxiliary power unit.

16. The method of claim 15, including altering the frequency of the power from the auxiliary power unit to match the main power supply frequency before providing the auxiliary power to the load.

17. The method of claim 13, including making a switch from the auxiliary power unit to the main power supply.

18. The method of claim 17, including altering the frequency of the power from the auxiliary power unit supplied to the load to match the main power supply frequency before coupling the power supply to the load.

* * * * *

UNITED STATES PATENT AND TRADEMARK OFFICE
CERTIFICATE OF CORRECTION

PATENT NO. : 6,806,589 B1
DATED : October 19, 2004
INVENTOR(S) : Suttie

It is certified that error appears in the above-identified patent and that said Letters Patent is hereby corrected as shown below:

<u>Column 4,</u>
Line 50, please insert -- unit power -- after "power" and before "to".
Line 56, please insert -- main -- after "the" and before "power".

Signed and Sealed this

Twenty-third Day of August, 2005

JON W. DUDAS
*Director of the United States Patent and Trademark Office*